(12) United States Patent
Lee

(10) Patent No.: US 7,904,958 B2
(45) Date of Patent: Mar. 8, 2011

(54) SPAM HONEYPOT DOMAIN IDENTIFICATION

(75) Inventor: Martin Giles Lee, Oxford (GB)

(73) Assignee: Symantec Corporation, Mountain View, CA (US)

( * ) Notice: Subject to any disclaimer, the term of this patent is extended or adjusted under 35 U.S.C. 154(b) by 1024 days.

(21) Appl. No.: 11/711,094

(22) Filed: Feb. 27, 2007

(65) Prior Publication Data

US 2008/0209554 A1 Aug. 28, 2008

(51) Int. Cl.
*H04L 29/00* (2006.01)
(52) U.S. Cl. .......................................... 726/22; 709/206
(58) Field of Classification Search .............. 726/22–25; 709/206
See application file for complete search history.

(56) References Cited

U.S. PATENT DOCUMENTS

| | | | |
|---|---|---|---|
| 6,338,082 B1 | 1/2002 | Schneider | |
| 2001/0021947 A1 | 9/2001 | Kim | |
| 2002/0169764 A1 | 11/2002 | Kinkaid et al. | |
| 2003/0140105 A1 | 7/2003 | Tanimoto | |
| 2003/0212673 A1 | 11/2003 | Kadayam et al. | |
| 2004/0128543 A1* | 7/2004 | Blake et al. | 713/201 |
| 2005/0125451 A1 | 6/2005 | Mooney | |
| 2006/0004850 A1 | 1/2006 | Chowhury | |
| 2006/0059126 A1 | 3/2006 | Naick et al. | |
| 2006/0059136 A1 | 3/2006 | Wooldridge et al. | |
| 2006/0068755 A1 | 3/2006 | Shraim et al. | |
| 2006/0069697 A1* | 3/2006 | Shraim et al. | 707/102 |
| 2006/0075099 A1 | 4/2006 | Pearson et al. | |
| 2006/0155693 A1 | 7/2006 | Chowdhury et al. | |
| 2006/0174033 A1 | 8/2006 | Gillum et al. | |
| 2006/0282795 A1 | 12/2006 | Clark et al. | |
| 2007/0078936 A1* | 4/2007 | Quinlan et al. | 709/206 |
| 2008/0086467 A1* | 4/2008 | Crumb et al. | 707/5 |

FOREIGN PATENT DOCUMENTS

| | | |
|---|---|---|
| WO | 00/22543 | 4/2000 |
| WO | 02/48913 | 6/2002 |

OTHER PUBLICATIONS

International Search Report App. No. PCT/PCT/GB2008/000481, dated Jun. 30, 2008.
Artail et al.; "A hybrid honeypot framework for improving intrusion detection systems in protecting organizational networks"; Computers & Sercurity, Elsevier Science Publishers, Amsterdam, NL; vol. 25, No. 4, Jun. 1, 2006; pp. 274-288, XP005503799 ISSN: 0167-4048.
Kuwatly I et al.; "A Dynamic Honeypot Design for Intrusion Detection"; Pervasive Services, 2004, ICPS 2004; IEEE/ACS International Conference on Beirut, Lebanon Jul. 19-23, 2004, Piscataway, NJ, USA, IEEE; Jul. 19, 2004, pp. 95-104, XP010759999; ISBN: 978-0-7695-2535-8.
Teo L. et al.; "Defeating internet attacks using risk awareness and active honeypots"; Information Assurance Workshop, 2004. Proceedings, Second IEEE International Charlotte, NC, USA Apr. 8-9, 2004, Piscataway, NJ, USA, IEEE; Apr. 8, 2004, pp. 155-167; ISBN: 978-0-7695-2117-6.

* cited by examiner

*Primary Examiner* — Brandon S Hoffman
*Assistant Examiner* — Anthony Brown
(74) *Attorney, Agent, or Firm* — Gunnison, McKay & Hodgson, L.L.P.; Philip McKay

(57) ABSTRACT

Identification of spam honeypot domains is performed automatically by a system. The system searches sources of Internet domains based on user input to identify Internet domains which are candidates for acting as a honeypot domain. The list of domains is refined by a determination unit to exclude domains which are unlikely to be useful. A domain indexer ranks the domains on the basis of a plurality of criteria which are indicative of the likelihood of a domain receiving spam communications.

17 Claims, 1 Drawing Sheet

SPAM HONEYPOT DOMAIN IDENTIFICATION

Figure 1:
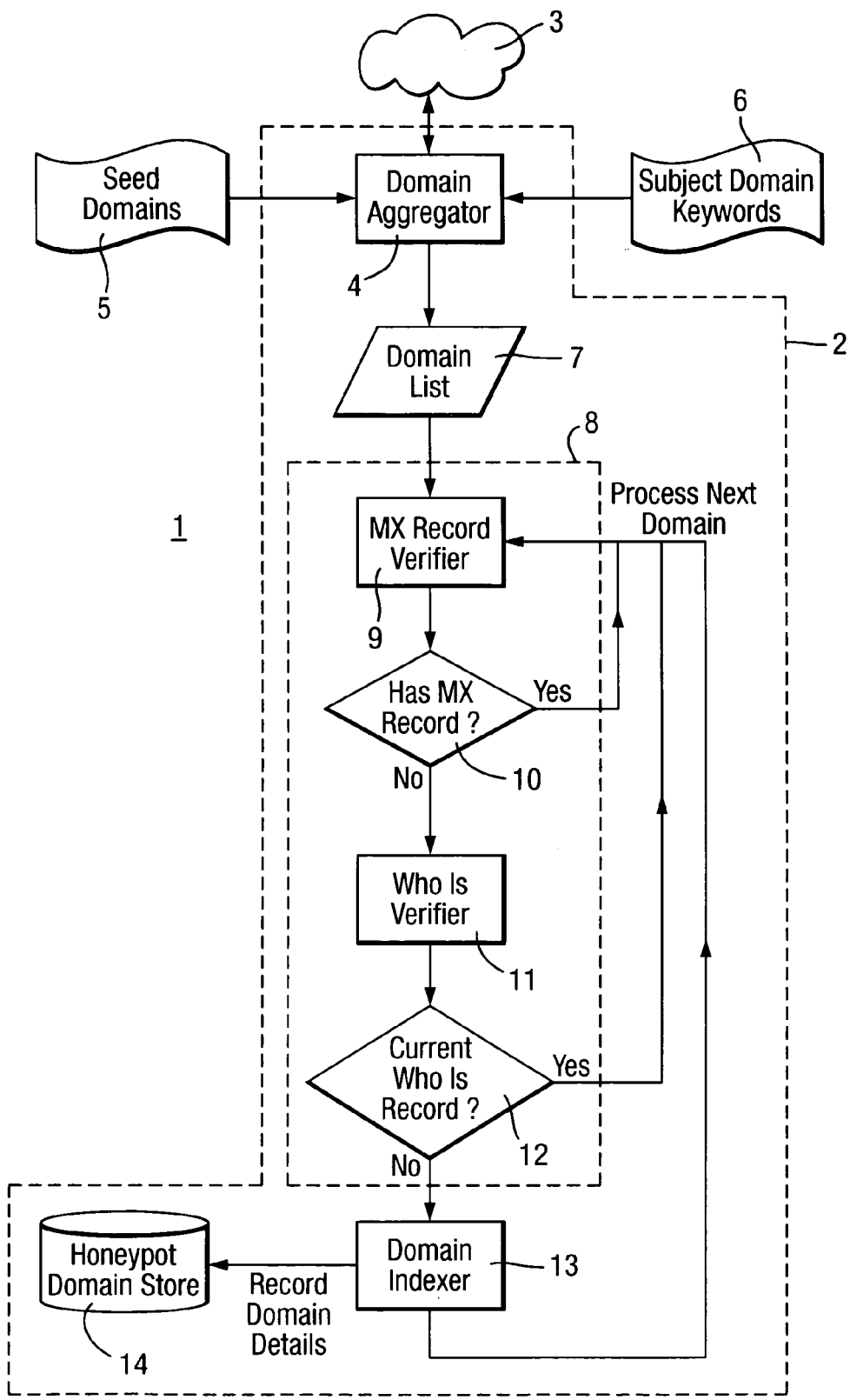

The present invention relates to the detection of spam communications, such as emails, in particular to the identification of domains which are suitable for use as a honeypot for attracting spam which may itself be used to develop spam detection systems and filters.

The term spam refers to communications, in this case electronic communications such as emails, which are unsolicited and unwanted. Currently, the Internet is flooded with spam emails which are sent in bulk, typically by sending identical or similar emails to large numbers of recipients. Spam emails cause nuisance by flooding recipients' email inboxes with unwanted messages. Frequently the contents of the spam may contain fraudulent or explicit content and may cause distress or financial loss. The time spent dealing with these messages, the resources required to store and process them on an email system, and wasted network resources can be a significant waste of money.

Spam detection systems and filters may be used to detect spam communications within Internet traffic. On detection of spam, remedial action may be taken, for example discarding the spam communication or marking it as spam. A variety of techniques are employed for detecting spam. However, to develop and to implement such techniques, it is necessary to have access to large quantities of spam communications. This allows the conduct of research, testing and refinement of spam detection processes.

Reports of spam submitted by the recipients tend to be sporadic in nature and have truncated or absent header information. Additionally, recipients tend to be inconsistent in their criteria as to what constitutes spam. These constraints limit the reliability of this source of spam for the purposes of spam research.

As an alternative source of spam communications, it is known to use spam honeypots, that is domains that have been set up purposely to receive spam communications in a real-time environment. The spam received by a correctly configured honeypot domain contains all the header information intact, and accurately reflects the spam in circulation at any one moment in time. By way of example, US-2006/075,099 describes the use of a honeypot system for extracting fingerprints to assist in spam and virus detection.

However, spammers will only send spam to the honeypot domain if they believe that they are sending communications to the email addresses of real people rather than to a domain set up to study their activities. This is achieved by seeding the honeypot domain, that is to say, publishing email addresses on the internet so that spammers will discover these addresses and add them to their databases of email addresses to which they send spam.

The advantage of seeding a honeypot domain in this manner is that one can be certain that any mail delivered to such an address is certainly spam. Through simply publishing an email address, no consent has been given by that recipient to receiving any form of email. In this case, all email sent to this address can be considered as unsolicited, as no communication or solicitation to communicate has been made. The major disadvantage associated with this technique is that it is a labour intensive activity to conspicuously leave email addresses in various places on the internet. There is also a potentially significant time lag between seeding an address, it being indexed by a spammer, and spam being received by the address.

A refinement to the technique of explicitly seeding honeypot domains by hand is to purchase domains that have been already seeded and are already receiving spam. However in these cases one cannot be certain that all email sent to the domain is unsolicited, since the previous users of the domain may have subscribed to newsletters and solicited communication. However, one can assume that during their day-to-day activities they will have inadvertently exposed their email address in a manner to allow spammers to index it, and send spam to that address.

One of the best sources of such domains are those which have previously been used by companies for business purposes. Over time business users tend to receive increasing amounts of spam as their email addresses become disseminated, especially when published on web pages. Unfortunately it is a difficult task to discover such "second hand" domains, especially those that have been well used over a long period and subsequently receive a lot of spam. The present invention is concerned with methods and systems which are capable of improving the process of discovering domains which are suitable as honeypots.

The various aspects of the invention provide systems and methods which allow the discovery of honeypot domains to be automated in a manner in which the speed and reliability of the discovery process is improved.

According to the first aspect of the present invention, there is provided a system for identifying Internet domains for use as a honeypot domain for attracting spam communications, the system comprising:

means for accepting user input;

a domain aggregator arranged to search sources of Internet domains based on the user input to identify Internet domains which are candidates for acting as a honeypot domain and to output a list of the identified Internet domains.

Further according to the first aspect of the present invention, there is provided a computer-implemented method of identifying Internet domains for use as a honeypot domain for attracting spam communications, the method comprising:

maintaining a database of Internet domains which are candidates for acting as a honeypot domain;

accepting user input;

searching the database to identify Internet domains based on the user input and to output a list of the identified Internet domains.

The first aspect of the invention provides for automatic selection of Internet domains from appropriate sources. A wide variety of sources may be used, including for example: information given in web pages; logging information; domains contained in known spam emails; and databases of domains available on the Internet. Indeed the range of sources available can itself cause the problem that it is difficult to pick out useful domains. However the automatic searching technique based on user input allows the process of selecting domains to be improved, thereby allowing the user to select domains that receive profiles of spam expected to be similar to that received by a specific type of domain. The user input may comprise keywords or seed domains.

According to the second aspect of the present invention, there is provided a system for identifying Internet domains for use as a honeypot domain for attracting spam communications, the system comprising:

a determination unit arranged to receive a list of Internet domains which are candidates for acting as a honeypot domain, arranged to determine, in respect of individual Internet domains in the list, (a) whether there is a published identification of a computer system which accepts communications for the domain, and (b) whether there is a published record of the domain having an owner, arranged to refine the list of Internet domains, on the basis of the determination results to exclude domains for which either (a) there is a published identification of a computer system which accepts communications for the domain or (b) whether there is a published record of the domain having an owner, and arranged to output the refined list.

Further according to the second aspect of the present invention, there is provided a computer-implemented method of identifying Internet domains for use as a honeypot domain for attracting spam communications, the method comprising:

deriving a list of Internet domains which are candidates for acting as a honeypot domain;

determining, in respect of individual Internet domains in the list, (a) whether there is a published identification of a computer system which accepts communications for the domain, and (b) whether there is a published record of the domain having an owner; and refining the list of Internet domains, on the basis of the determination results to exclude domains for which either (a) there is a published identification of a computer system which accepts communications for the domain or (b) whether there is a published record of the domain having an owner, and outputting the refined list.

The second aspect of the invention allows a list of Internet domains which are candidates for acting as a honeypot domain to be refined. The list may be a list derived using the first aspect of the invention but could be derived in some other way. According to the second aspect of the invention, checks are performed on the domains in the list. Domains are removed if there is a published identification of a computer system which accepts communications for the domain, because this implies the domain is currently being used and hence unlikely to be available for use as a honeypot domain. Similarly, domains are removed if there is a published record of the domain having an owner, because this again implies that they are unlikely to be available for purchase. Hence the determination system facilitates the selection of honeypot domains by refining the list of candidate domains to remove ones which are unlikely to be useful.

According to the third aspect of the present invention, there is provided a system for identifying Internet domains for use as a honeypot domain for attracting spam communications, the system comprising:

a ranking unit arranged to receive a list of Internet domains which are candidates for acting as a honeypot domain, and arranged to generate a relative ranking for each Internet domain in the list on the basis of a plurality of criteria which are indicative of the likelihood of a domain receiving spam communications.

Further according to the third aspect of the present invention, there is provided a computer-implemented method of identifying Internet domains for use as a honeypot domain for attracting spam communications, the method comprising:

deriving a list of Internet domains which are candidates for acting as a honeypot domain; and generating a relative ranking for each Internet domain in the list on the basis of a plurality of criteria which are indicative of the likelihood of a domain receiving spam communications.

The third aspect of the invention allows a list of Internet domains to be ranked the amount of spam which they are predicted to receive. The list may be a list derived using the first or second aspect of the invention but could be derived in some other way. By so ranking the domains, it is possible to select domains which are most likely to be useful. This improves the speed and reliability of the process by reducing the amount of resource wasted on honeypot domains which are ineffective.

The various aspects of the invention may be used together in any combination, resulting in a fast and reliable process by which honeypot domains receiving large volumes of spam can be easily identified.

Using the resultant lists of identified honeypot domains, individual honeypot domains may be chosen and actually configured as an honeypot domain to receive emails and other communications. As the invention allows more effective selection of honeypot domains, a benefit of the invention is that resources are not wasted setting up ineffective honeypot domains. Conversely, the honeypot domains are themselves more effective in the collection of spam. The collected spam may be used to develop spam detection systems and filters. Thus the improved selection of honeypot domains can ultimately improve the performance of the spam detection.

To allow better understanding, an embodiment of the present invention will now be described by way of non-limitative example with reference to the accompanying drawings, in which:

FIG. 1 is a diagram of a system for identifying Internet domains for use as a honeypot domain.

There is shown in FIG. 1 an automated system 1 that is able to discover internet domains suitable for use as honeypot domains in a consistent, predictable and reproducible manner. The system 1 implements a method of selecting the domains and hence is illustrated in part by a flow chart. The system 1 is implemented by a computer program running on a computer system 2 which may be of any suitable type, for example an ordinary personal computer.

A domain aggregator 4 acts as a search engine to search sources of Internet domains to generate and output a list 7 of domains which are candidates for acting as a honeypot domain. The domain aggregator 4 accepts user inputs in the form of seed domains 5 and/or keywords 6. The user inputs may be accepted by the computer system 2 in a conventional manner for example through use of a keyboard and mouse to interact with a graphical user interface.

A wide variety of sources of Internet domains may be searched by the domain aggregator 4. Typically the source is accessed over the Internet 3 but equally domains could be retrieved and stored locally to the computer system 2 to act as a source. By way of example and without limitation, some suitable sources are as follows. New domains may be identified on web pages that have been indexed by a search engine, where the new domain is found on a page including one or more of the seed domains or keywords. The new domains may be found in commercially available lists of domain registrations or disposals where one of more of the seed domains is found. Other sources of data for finding related domains included the forged "From" headers found in spam emails. Equally, company or marketing directories are also good sources.

The number of domains which can be accessed by the domain aggregator 4 is typically large. Resources for setting up honeypot domains are limited by practical considerations and so it is necessary to select some of the domains, but it is difficult to know which domains will be effective. Therefore the system 1 uses the domains 5 and/or keywords 6 by searching for new domains that have an association with the seed domains 5 and/or keywords 6. The located domains are output in a list 7 which is stored in the computer system 2 and may be displayed to the user. The association may be finding a domain in proximity to one or more of the seed domains 5 and keywords 6 in a document or database entry associated with the domain.

The domain aggregator 4 allows the user to select a list 7 of domains which have some shared similarity. The similarity may be for example a geographical region, a market sector, a set of known high volume spam domains, or any other criteria. The keywords 6 may be chosen by the user so as to describe a certain characteristic, for example a subject domain, geographical region or market sector. The seed domains 5 may be chosen to be representative of a given type of domain, typically one known to receive large amounts of spam. Carefully chosen seed domains 5 and key words 6 may be used to discover suitable honeypot domains that receive spam reflective of that received by specific profile of user, e.g. Japanese electronic manufacturers, Californian software developers, agro-chemical suppliers etc.

The domain aggregator 4 may be omitted, with the system 1 instead using a list 7 which is a simple pre-collected list of domains used for the discovery of honeypot domains, for example input by the user. However, the implementation in the domain aggregator 4 of a keyword or seed domain directed search enables the discovery of domains that fulfil certain criteria and are fruitful honeypots, especially if the seed domains 6 themselves are already known to receive large quantities of spam.

The list 7 of domains is then processed by a determination unit 8 which performs checks on the individual domains in the list 7 and then refines the list 7 by excluding some domains on the basis of the checks. The determination unit 8 is arranged as follows. In this implementation each individual domain in the list 7 is processed serially.

Each individual domain is first passed to an MX record verifier 9 which makes a DNS query requesting an MX record for the domain. In order for a domain to receive email, the IP address of the machine that is configured to accept mail for the domain must be publicly available. An MX record is a type of published resource record in the Domain Name System (DNS) specifying how Internet e-mail should be routed and identifying the names of the domain mail servers. From this the IP address of any of these machines can be retrieved by a subsequent DNS query. As shown by the decision 10, the MX record verifier 9 determines whether an MX record is received in response to the DNS query.

Domains which have a published MX record are in current use and are unlikely to be available for purchase as a honeypot. Accordingly if it is determined in decision 10 that an MX record is received, then the domain is discarded. The process flow returns to the MX record verifier 9 to handle the next domain.

If a domain does not have a published MX record then it can be inferred that the domain is dormant. That is to say, that the domain has expired and is available for purchase, or that the domain is registered by the owner, but not configured to accept email. Accordingly if it is determined in decision 10 that an MX record is received, then the process flow continues to a WHOIS verifier 11.

The WHOIS verifier 11 makes a WHOIS query to retrieve the published registration information for a domain. If this exists then there is a published record of the domain having an owner. WHOIS is a TCP-based query/response protocol which is widely used for querying a database in order to determine the owner of inter alia a domain. The WHOIS query may be issued using any technique, including without limitation: using a command line interface text client, for example on a Unix platform; querying a database; or issuing a web request.

As shown by the decision 12, the WHOIS verifier 11 determines whether the registration information is retrieved in response to the WHOIS query and whether the domain is currently registered. If so, then the domain is discarded and the process flow returns to the MX record verifier 9 to handle the next domain. This is on the basis that a domain having an owner is unlikely to be available for use as a honeypot.

Otherwise, if it is determined in decision 12 that the domain has no published record of an owner, the process flow continues to a domain indexer 13. Thus the domain indexer 13 processes each domain which is not discarded by the determination unit. Effectively therefore determination unit 8 refines the list 7 by excluding some domains on the basis of the checks. Optionally, the determination unit 8 may be omitted so that the domain indexer 13 processes each domain in the list 7.

The domain indexer 13 is a unit generates a ranking for each individual domain. The ranking is generated as a numeric score which is indicative of the likelihood of the domain receiving spam emails. The score is calculated as the sum of values in respect of a plurality of criteria. Relative weights are applied to the values in respect of each criterion so that the criteria may have different importance to the final value of the ranking. The criteria are themselves indicative of the likelihood of the domain receiving spam emails. A wide range of criteria may be applied. Some examples of suitable criteria without limitation are:

- The date at which the domain was first registered. The older the domain, the larger the volume of spam it may receive.
- The length of time for which the domain was registered. Domains that were active over a long period of time may receive more spam.
- The degree to which the domain is published. A domain which is included in many data sources, or found on many internet pages, or which occurs in many USENET posting is likely to receive much spam.
- The amount of mail sent from or received by the domain. The higher the volume of mail, the more likely spammers are to have identified the domain.
- The number of users who were active on the domain. Again, the higher the number of users, the more likely spammers are to have identified the domain.

The nature and exact weighting of these criteria may be refined over time according to the accuracy of previous predictions.

The ranking calculated by the domain indexer 13 and the domain to which it relates are stored in the honeypot domain database 14. Once all the domains in the list 7 have been processed, the honeypot domain database 14 effectively stores a refined version of the list 7, excluding the domains discarded by the determination unit 8. Furthermore the stored values of the rankings allow all the domains to be ranked relative to each other, domains with higher rankings being more likely to receive large volumes of spam than domains with lower rankings. Sets of domains may also be grouped according to domain country code, presence of dictionary words in the domain, length of domain name, etc.

By way of illustration, an example of the operation of the system 1 will now be described.

In this example, the keywords 6 input to the domain aggregator 4 are "email security solution service". The domain aggregator 4 queries a number of data sources, including internet search engines, with these keywords. domain aggregator 4 returns a list 7 of domains that it has found in the data sources and which it considers as relevant. Included in this list 7, among others, are the domains "messagelabs.com" and "exampledomain.com" (which is fictional).

The MX record verifier 9 determines that the domain "messagelabs.com" has a published MX record, and therefore discards this domain on the basis that it is not available for purchase.

However the domain "exampledomain.com" is not discarded by the determination unit 8 and so is passed to the domain indexer 13 which calculates a ranking for this domain as follows. The domain indexer 13 refers to three example criteria set out above and identifies that the domain "exampledomain.com" was first registered in 1999, has been in use for at least 6 years, and is found on about 270 000 internet pages according to Google. The early registration date, long number of years in use, and large number of web pages including the domain, causes the domain indexer 13 to generate a ranking having a relatively high value.

For instance, the ranking system employed by the domain indexer 13 may weight the different criteria as follows:

Registration date before 2004 scores 10 points, before 2002, 20 points, before 2000, 30 points, before 1998, 40 points.

A domain in use for 1 year scores 5 points, 2 years, 10 points, 3 years 20 points, 4 years 30 points.

Domain occurring on more than 50 web pages scores 10 points, more than 200, 20 points, more than 500, 30 points, more than 1000, 40 points, more than 5000, 50 points.

Under this ranking system, the domain indexer 13 would generate a ranking for the domain "exampledomain.com" of 20+30+50=100 points from a possible maximum of 120 points, indicating it as a potential honeypot domain attracting a large amount of spam.

The domains stored in the honeypot domain database 14 are used as follows. The user of the system 1 selects individual domains from the honeypot domain database 14. Using the rankings, the user is able to select domains having the highest likelihood of receiving spam emails. The domain is then be purchased from the registration body and an MX record is registered. The domain is set up with a mail server to act as a honeypot domain. Thereafter all emails sent to the honeypot domain are collected. This provides a body of spam emails which are then used to develop spam detection systems and filters. As the system 1 provides speedy identification of domains which are effective in attracting spam, the resources needed to set up the honeypot domains are reduced and a good quality selection of spam is collected which can ultimately improve the performance of the spam detection.

The invention claimed is:

1. A system for identifying Internet domains for use as a honeypot domain for attracting spam communications, the system comprising:
   a computer system;
   means within the computer system for accepting user input;
   a domain aggregator within the computer system coupled to the means for accepting user input, the domain aggregator arranged to search sources of Internet domains based on the user input to identify Internet domains which are candidates for acting as a honeypot domain and to output a list of the identified Internet domains;
   a determination unit within the computer system coupled to the domain aggregator and arranged to receive the list of identified Internet domains output by the domain aggregator and arranged to determine, in respect of individual Internet domains in the list, (a) whether there is a published identification of a computer system which accepts communications for the domain, and (b) whether there is a published record of the domain having an owner, arranged to refine the list of Internet domains, on the basis of the determination results to exclude domains for which either (a) there is a published identification of a computer system which accepts communications for the domain or (b) whether there is a published record of the domain having an owner, and arranged to output the refined list;
   wherein the determination unit is arranged to determine whether there is a published identification of a computer system which accepts communications for the domain is performed by making a DNS query requesting an MX record for the domain and determining whether an MX record is received in response, wherein if an MX record is not received in response to the DNs query, the domain is considered to be a candidate for acting as a honeypot domain, and wherein if an MX record is received in response to the DNS query, the domain is not considered to be a candidate for acting as a honeypot domain.

2. A system according to claim 1, wherein the user input comprises at least one keyword.

3. A system according to claim 1, wherein the user input comprises a seed domain.

4. A system according to claim 1, wherein the sources of Internet domains include one or more of:
   information given in web pages;
   logging information;
   domains contained in known spam emails; and databases or lists of domains available on the Internet.

5. A system according to claim 1, wherein the determination unit is arranged to determine whether there is a published record of the domain having an owner is performed by making a WHOIS query.

6. A system according to claim 1, the system further comprising:
   a ranking unit arranged to receive the refined list of the Internet domains output by the determination unit, and arranged to generate a relative ranking for each Internet domain in the list on the basis of a plurality of criteria which are indicative of the likelihood of a domain receiving spam communications.

7. A system according to claim 6, wherein the plurality of criteria include one or more of:
   the period elapsed since the domain was first registered;
   the period of time for which the domain was registered; the amount of mail sent from or received by the domain;
   the number of users who were active on the domain; and
   the degree of public exposure of the domain.

8. A system according to claim 6, wherein the relative ranking for each Internet domain in the list is generated as a sum of values in respect of each of the criteria with relative weights being applied to each of the criteria.

9. A system according to claim 1, the system further comprising:
   a ranking unit arranged to receive the list of the identified Internet domains output by the domain aggregator, and arranged to generate a relative ranking for each Internet domain in the list on the basis of a plurality of criteria which are indicative of the likelihood of a domain receiving spam communications.

10. A system for identifying Internet domains for use as a honeypot domain for attracting spam communications, the system comprising:
    a computer system;
    a determination unit within the computer system arranged to receive a list of Internet domains which are candidates for acting as a honeypot domain, arranged to determine, in respect of individual Internet domains in the list, (a) whether there is a published identification of a computer system which accepts communications for the domain, and (b) whether there is a published record of the domain having an owner, arranged to refine the list of Internet domains, on the basis of the determination results to exclude domains for which either (a) there is a published identification of a computer system which accepts communications for the domain or (b) whether there is a published record of the domain having an owner;

wherein the determination unit is arranged to determine whether there is a published identification of a computer system which accepts communications for the domain is performed by making a DNS query requesting an MX record for the domain and determining whether an MX record is received in response, wherein if an MX record is not received in response to the DNs query, the domain is considered to be a candidate for acting as a honeypot domain and thus kept on the list, and wherein if an MX record is received in response to the DNS query, the domain is not considered to be a candidate for acting as a honeypot domain, and thus removed from the list;

wherein the determination unit is further arranged to output the refined list.

11. A system according to claim 10, wherein the determination unit is arranged to determine whether there is a published record of the domain having an owner is performed by making a WHOIS query.

12. A system according to claim 10, the system further comprising:

a ranking unit arranged to receive the refined list of the Internet domains output by the determination unit, and arranged to generate a relative ranking for each Internet domain in the list on the basis of a plurality of criteria which are indicative of the likelihood of a domain receiving spam communications.

13. A system according to claim 12, wherein the plurality of criteria include one or more of:

the period elapsed since the domain was first registered;
the period of time for which the domain was registered;
the amount of mail sent from or received by the domain;
the number of users who were active on the domain; and
the degree of public exposure of the domain.

14. A system according to claim 12, wherein the relative ranking for each Internet domain in the list is generated as a sum of values in respect of each of the criteria with relative weights being applied to each of the criteria.

15. A system for identifying Internet domains for use as a honeypot domain for attracting spam communications, the system comprising:

a computer system;

a ranking unit within the computer system arranged to receive a list of Internet domains which are candidates for acting as a honeypot domain, and arranged to generate a relative ranking for each Internet domain in the list on the basis of a plurality of criteria which are indicative of the likelihood of a domain receiving spam communications, the criteria relating to specific characteristics about each domain.

16. A system according to claim 15, wherein the plurality of criteria include one or more of:

the period elapsed since the domain was first registered;
the period of time for which the domain was registered;
the amount of mail sent from or received by the domain;
the number of users who were active on the domain; and the degree of public exposure of the domain.

17. A system according to claim 15, wherein the relative ranking for each Internet domain in the list is generated as a sum of values in respect of each of the criteria with relative weights being applied to the criteria.

* * * * *